United States Patent
Lee et al.

(10) Patent No.: US 7,728,763 B2
(45) Date of Patent: Jun. 1, 2010

(54) HIGH RESOLUTION RANGING APPARATUS AND METHOD USING UWB

(75) Inventors: Cheol-Hyo Lee, Daejeon (KR); Jae-Young Kim, Bucheon-si (KR); Eun-Chang Choi, Daejeon (KR); Chong-Hyun Lee, Seoul (KR)

(73) Assignee: Electronics and Telecommunications Research Institute (KR)

( * ) Notice: Subject to any disclaimer, the term of this patent is extended or adjusted under 35 U.S.C. 154(b) by 96 days.

(21) Appl. No.: 11/996,218

(22) PCT Filed: Dec. 26, 2005

(86) PCT No.: PCT/KR2005/004533

§ 371 (c)(1),
(2), (4) Date: Jan. 18, 2008

(87) PCT Pub. No.: WO2007/011098

PCT Pub. Date: Jan. 25, 2007

(65) Prior Publication Data

US 2008/0218403 A1 Sep. 11, 2008

(30) Foreign Application Priority Data

Jul. 19, 2005 (KR) .................. 10-2005-0065460
Dec. 20, 2005 (KR) .................. 10-2005-0126241

(51) Int. Cl.
*G01S 13/08* (2006.01)

(52) U.S. Cl. .................. 342/118; 342/192; 342/196; 455/65

(58) Field of Classification Search .................. 342/118
See application file for complete search history.

(56) References Cited

U.S. PATENT DOCUMENTS 6,009,334 A * 12/1999 Grubeck et al. .......... 455/456.2
6,373,427 B1 * 4/2002 Hohne ........................ 342/128
6,963,727 B2 * 11/2005 Shreve ........................ 455/39

(Continued)

FOREIGN PATENT DOCUMENTS

JP 5341038 12/1993

(Continued)

OTHER PUBLICATIONS

Marie-Anges Pallas et al., Active High Resolution Time Delay Estimation for Large BT Signals, IEEE Translations on Signal Processing, vol. 39, No. 4, pp. 781-788, Apr. 1991.

(Continued)

*Primary Examiner*—Thomas H Tarcza
*Assistant Examiner*—Matthew M Barker
(74) *Attorney, Agent, or Firm*—Jae Y. Park; Kile Goekjian Reed & McManus

(57) ABSTRACT

Provided is a high resolution distance ranging apparatus using an ultra-wideband (UWB) communication. The apparatus includes: a first spectrum analyzer for extracting a frequency component corresponding to multipath time delay from a reception signal; a second spectrum analyzer for acquiring a noise subspace of the extracted frequency component and extracting a frequency component where maximum power is located from a frequency spectrum based on the noise subspace; a time of arrival (TOA) extractor for extracting TOA based on the frequency component where maximum power is located.

12 Claims, 3 Drawing Sheets

U.S. PATENT DOCUMENTS

| | | | |
|---|---|---|---|
| 6,987,393 B2 * | 1/2006 | Jean et al. | 324/644 |
| 7,283,926 B2 * | 10/2007 | Wu | 702/159 |
| 2004/0240565 A1 * | 12/2004 | Santhoff et al. | 375/259 |
| 2005/0026563 A1 | 2/2005 | Leeper et al. | |
| 2007/0018891 A1 * | 1/2007 | Golden et al. | 342/420 |
| 2007/0036241 A1 * | 2/2007 | Sahinoglu et al. | 375/317 |
| 2009/0021420 A1 * | 1/2009 | Sahinoglu | 342/135 |
| 2009/0028221 A1 * | 1/2009 | Sahinoglu et al. | 375/138 |

FOREIGN PATENT DOCUMENTS

| | | |
|---|---|---|
| JP | 11352215 | 12/1999 |
| KR | 1020020054518 | 7/2002 |
| KR | 1020020077900 | 10/2002 |
| KR | 1020020094736 | 12/2002 |
| KR | 1020050005234 | 1/2005 |
| WO | WO 9946863 | 9/1999 |
| WO | WO 0031699 | 6/2000 |
| WO | 03/001699 A1 | 1/2003 |
| WO | WO 03077432 | 9/2003 |

OTHER PUBLICATIONS

International Search Report for corresponding International Application No. PCT/KR2005/004533 dated Apr. 14, 2006.

Notice of Allowance of 9-5-2007-055938980 dated Oct. 22, 2007.

* cited by examiner

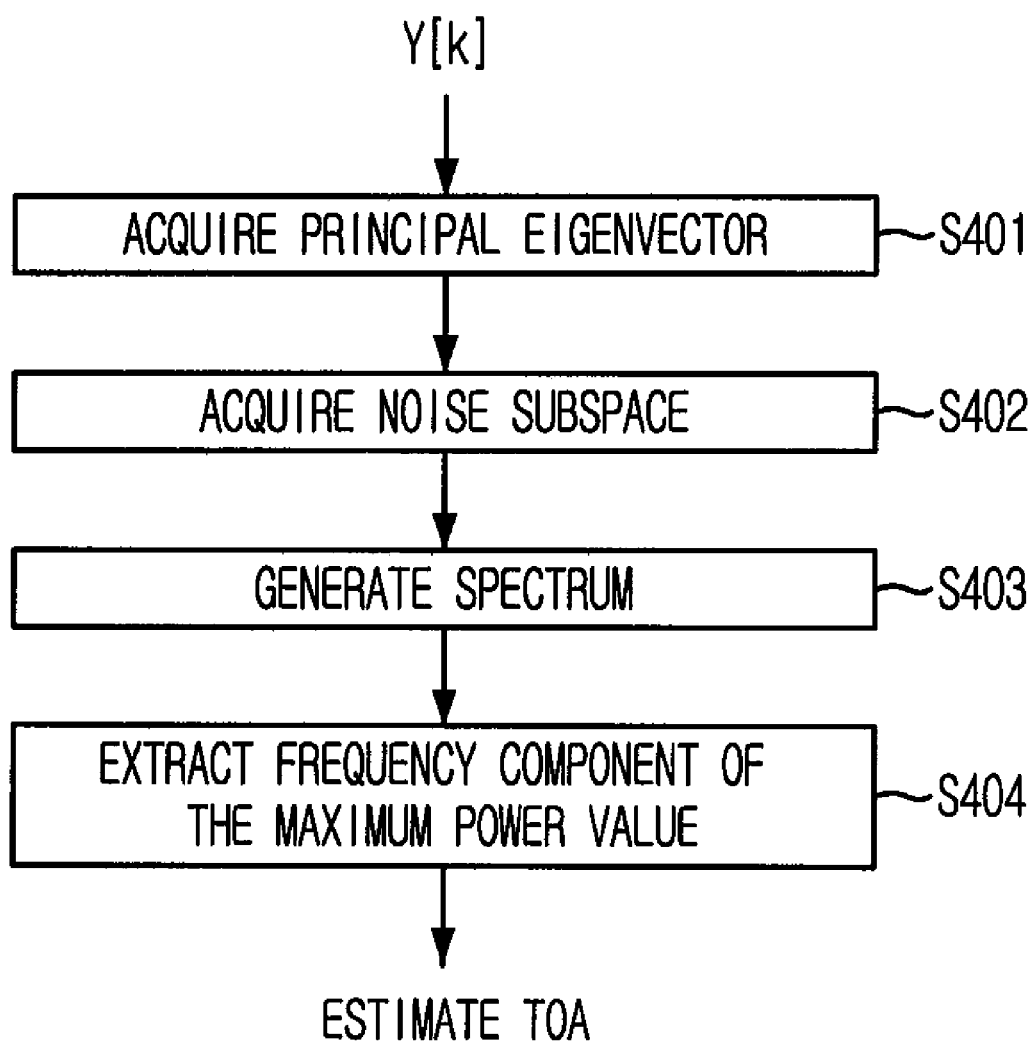

HIGH RESOLUTION RANGING APPARATUS AND METHOD USING UWB

TECHNICAL FIELD

The present invention relates to a high resolution distance ranging apparatus using an ultra-wideband (UWB) communication; and, more particularly, to a high resolution ranging apparatus and method using a UWB communication which can perform stably and reduce complexity of realization in analysis of spectrum components of a transmitted signal.

BACKGROUND ART

FIG. 1 is a block diagram showing a structure of a conventional distance ranging apparatus using an ultra-wideband (UWB) communication. The apparatus shown in FIG. 1 shows a structure of the distance ranging apparatus for a UWB radio.

A transmitted signal goes through a UWB antenna 101 and a band-pass filter 102 filters an output signal form the UBW antenna 101 and outputs a filtered signal. Subsequently, a UWB signal receiver 103 such as a UWB coherent receiver and a UWB noncoherent receiver demodulates a signal modulated in a transmitting part from an output signal of the band-pass filter 102 and an analog to digital converter (ADC) 104 converts the demodulated signal into a digital signal. When the digital signal is acquired by the ADC 104, sampling information on a frame defining a section where data are physically transmitted is acquired. A frame adder 105 adds the sampled data through many frames, thereby reducing noise components.

When the frame adder 105 adds many frames, a time of arrival (TOA) estimator 106 calculates energy of the signal accumulating the frames and detects a maximum value of the calculated energy through first and second image signal processes. The TOA estimator 106 ranges a distance by detecting TOA when the maximum value of the energy is detected.

As described above, the conventional distance ranging apparatus is a system for applying diverse techniques to find a proper threshold in a time area. Therefore, there is a problem that resolution in distance ranging is largely changed according to the threshold set up to find a point at which the transmitted signal starts.

Since the conventional distance ranging apparatus is based on a time area signal process, noise or interference can affect on the distance ranging.

DISCLOSURE

Technical Problem

It is, therefore, an object of the present invention to provide a high resolution distance ranging apparatus and method which can solve problems of a conventional technology.

More specific object of the present invention is to provide the high resolution distance ranging apparatus and method which can improve resolution of a ultra-wideband (UWB) distance ranging system and reduce complexity of a UWB signal receiver by reducing a computational quantity.

Other objects and advantages of the invention will be understood by the following description and become more apparent from the embodiments in accordance with the present invention, which are set forth hereinafter. It will be also apparent that objects and advantages of the invention can be embodied easily by the means defined in claims and combinations thereof.

Technical Solution

In accordance with one aspect of the present invention, there is provided a high resolution distance ranging apparatus using a ultra-wideband (UWB) communication, including: a first spectrum analyzer for extracting a frequency component corresponding to multipath time delay from a reception signal; a second spectrum analyzer for acquiring a noise subspace of the extracted frequency component and extracting a frequency component where maximum power is located from a frequency spectrum based on the noise subspace; a time of arrival (TOA) extractor for extracting TOA based on the frequency component where maximum power is located.

Advantageous Effects

As described above, a high resolution distance ranging system for ultra-wideband (UWB) radio of the present invention can maintain resolution of a distance although a value of a signal to noise ratio (S/N) is low. Also, it is possible to maintain the resolution of the distance with respect to noise such as multi-paths in diverse channel environments.

When a Fourier transform unit and a high resolution spectrum analyzer are processed in series, a noise subspace with respect to one dominant signal component is used. Accordingly, a technique which can reduce the computational quantity more than the conventional system is used. A high resolution distance ranging system can be effectively formed by controlling the number of sample data and reducing the complexity of the system.

DESCRIPTION OF DRAWINGS

The above and other objects and features of the present invention will become apparent from the following description of the preferred embodiments given in conjunction with the accompanying drawings, in which:

FIG. 4 is a flowchart showing a spectrum analyzing process operated by the high resolution spectrum analyzer of FIG. 2.

BEST MODE FOR THE INVENTION

Other objects and advantages of the present invention will become apparent from the following description of the embodiments with reference to the accompanying drawings. Therefore, those skilled in the art of the present invention can embody the technological concept and scope of the invention easily. In addition, if it is considered that detailed description on a related art may obscure the points of the present invention, the detailed description will not be provided herein. The preferred embodiments of the present invention will be described in detail hereinafter with reference to the attached drawings.

<Principle of Present Invention>

The present invention relates to a distance ranging system using an ultra-wideband (UWB) communication. A principle of the present invention for solving problems of a conventional technology is to range a distance through spectrum analysis on a reception signal not in a time region, but in a frequency region. Another principle of the present invention is to perform double steps of analyzing the spectrum and stably estimate resolution in distance ranging through a simple second step of analyzing the spectrum. Accordingly to the principles, the present invention can raise the resolution and reduce the computational quantity generated in a process of analyzing the spectrum of the reception signal.

The high resolution distance ranging system using the UWB communication of the present invention will be described in detail with reference to attached drawings.

Figure 2:
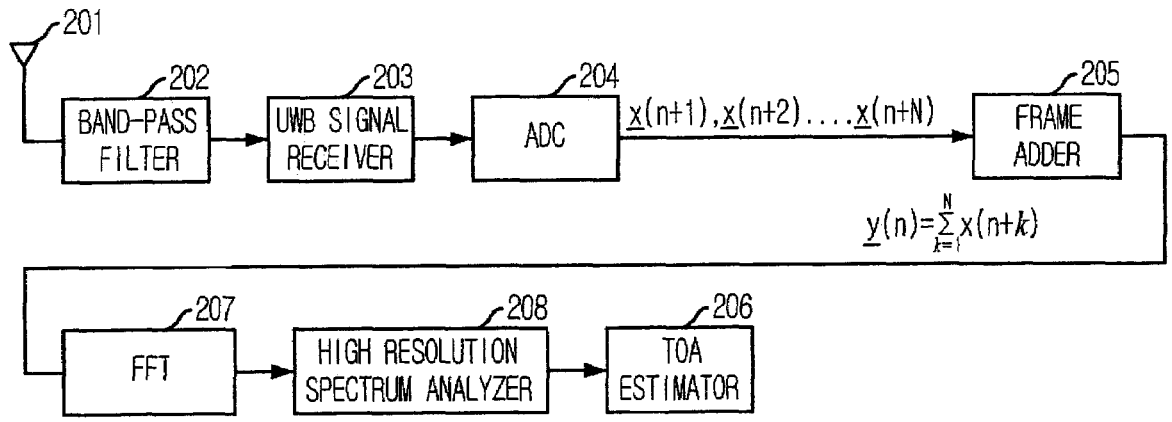
FIG. 2 is a block diagram showing a structure of the distance ranging apparatus using a UWB communication in accordance with an embodiment of the present invention.

FIG. 2 is a block diagram showing a structure of the distance ranging apparatus using a UWB communication in accordance with an embodiment of the present invention. FIG. 2 shows a structure of the distance ranging apparatus for UWB radio.

Figure 1:
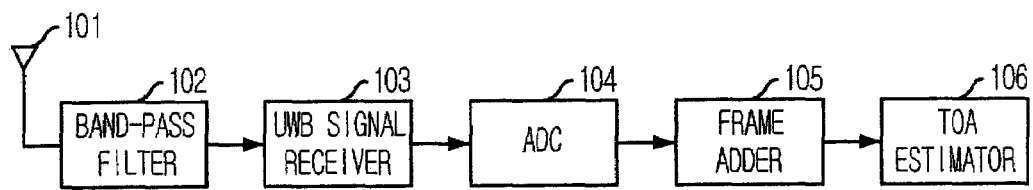
FIG. 1 is a block diagram showing a structure of a conventional distance ranging apparatus using an ultra-wideband (UWB) communication.

The distance ranging apparatus for the UWB radio includes an antenna 201 for UWB communication, a band-pass filter 202, a UWB signal receiver 203, an analog-to-digital converter (ADC) 204, a frame adder 205, a Fast Fourier Transform (FFT) 207, a high resolution spectrum analyzer 208, and a Time of Arrival (TOA) estimator 206. The antenna 201 for UWB communication, the band-pass filter 202, the UWB signal receiver 203, the ADC 204, and the frame adder 205 perform the same functions as components of FIG. 1.

A signal x(n) inputted to the frame adder 205 is formed on the basis of a frame unit including a header and a payload, and information included in the header is transmitted according to a regular pattern during a plurality of frames in a receiving part. Therefore, when information included in the header of a plurality of frames is accumulated, a noise component is reduced. The frame adder 205 divides the reception signal on the basis of the frame unit and at least 10 frames are accumulated.

The FFT 207 performs Fast Fourier Transform (FFT) on data y(n) accumulated in the frame adder 205. Background noise and interference are suppressed through the FFT and frequency components corresponding to multipath time delay can be extracted. An effective size of a sample for FFT is 64 or multiples of 2 among numbers larger than 64.

The high resolution spectrum analyzer 208 extracts a high resolution distance ranging value through spectrum analysis on the signal, on which FFT is performed by the FFT 207. The TOA estimator 206 estimates TOA by extracting a value having a maximum size from the frequency spectrum analyzed in the high resolution spectrum analyzer 208.

The TOA means a time of a first arriving signal. Accordingly, a distance can be acquired by multiplying a value of the TOA by a speed of light.

Figure 3:
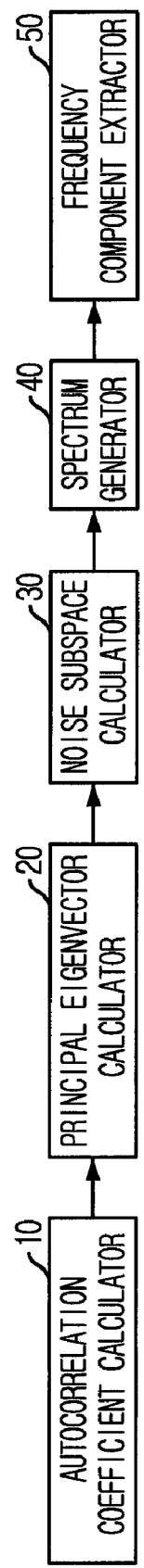
FIG. 3 is a block diagram showing a structure of a high resolution spectrum analyzer shown in FIG. 2.

FIG. 3 is a block diagram showing a structure of a high resolution spectrum analyzer shown in FIG. 2.

The high resolution spectrum analyzer 208 includes an autocorrelation coefficient calculator 10, a principal eigenvector calculator 20, a noise subspace calculator 30, a spectrum generator 40, and a frequency component extractor 50. The autocorrelation coefficient calculator 10 performs a circular convolution on an output signal of the first spectrum analyzing means and calculates an autocorrelation coefficient. The principal eigenvector calculator 20 calculates a principal eigenvector from the autocorrelation coefficient according to a power method. The noise subspace calculator 30 calculates a noise subspace for the principal eigenvector. The spectrum generator 40 generates a frequency spectrum based on the principal eigenvector and the noise subspace. The frequency component extractor 50 extracts a frequency component, at which the maximum power value is located in the frequency spectrum.

FIG. 4 is a flowchart showing a spectrum analyzing process operated by the high resolution spectrum analyzer of FIG. 2.

At step S401, the autocorrelation coefficient calculator 10 acquires an autocorrelation coefficient through a circular convolution on an output value of the FFT 207. When the output signal of the FFT 207 is Y[k], an autocorrelation coefficient r[k] of Y[k] is calculated by Equation 1.

$$r[k] = Y[k] \circledR Y[k] = \sum_{k=1}^{N} Y[k][Y(k-m)_N] \qquad \text{Eq. 1}$$

where $\circledR$ means the circular convolution.

The principal eigenvector calculator 20 forms the autocorrelation coefficient as a matrix and acquires a principal eigenvector from the matrix according to the power method. An autocorrelation matrix including the autocorrelation coefficient is as Equation 2 below.

$$R = \begin{vmatrix} r(0) & r(1) & \ldots & \ldots & r(N-1) \\ r(1) & \ldots & \ldots & \ldots & \ldots \\ \ldots & \ldots & \ldots & \ldots & \ldots \\ \ldots & \ldots & \ldots & \ldots & r(1) \\ r(N-1) & \ldots & \ldots & r(1) & r(0) \end{vmatrix} \qquad \text{Eq. 2}$$

At step S402, the noise subspace calculator 30 acquires the noise subspace by subtracting the principal eigenvector from an identity matrix. When the principal eigenvector is p, a noise subspace N is as Equation 3 below.

$$N = I - p \cdot p^H \qquad \text{Eq. 3}$$

where I is an N×N identity matrix, and H is a complex conjugate.

At step S403, the spectrum generator 40 generates a spectrum based on the principal eigenvector and the noise subspace. At step S404, the frequency component extractor 50 extracts a frequency component, in which the maximum power is located, from the spectrum generated in the step S403.

The TOA estimator 206 can acquire a TOA value from time information corresponding to the frequency component based on the frequency component extracted at the step S404.

In the spectrum analyzing process operated by the high resolution spectrum analyzer 208, power spectrum for the transmitted signal is acquired based on the noise subspace of the inputted signal and the most dominant spectrum offset is analyzed.

That is, the spectrum generator 40 finds the most dominant component among the noise subspaces at the step S403 and analyzes the spectrum based on the most dominant noise subspace. Therefore, when there are dominant signal components of n numbers in a frequency region, the present invention can perform a simple operation as much as 1/n in comparison with an operation of multiplying the signal components of n numbers by the noise subspace.

As described above, the technology of the present invention can be realized as a program and stored in a computer-readable recording medium, such as CD-ROM, RAM, ROM, a floppy disk, a hard disk and a magneto-optical disk. Since the process can be easily implemented by those skilled in the art, further description will not be provided herein.

While the present invention has been described with respect to certain preferred embodiments, it will be apparent to those skilled in the art that various changes and modifications may be made without departing from the scope of the invention as defined in the following claims.

INDUSTRIAL APPLICABILITY

As described above, the present invention can be applied to a high resolution distance ranging apparatus for ultra-wideband (UWB) communication.

What is claimed is:

1. A high resolution distance ranging apparatus using a ultra-wideband (UWB) communication, comprising:
    a first spectrum analyzing means for extracting a frequency component corresponding to multipath time delay from a reception signal;
    a second spectrum analyzing means for acquiring a noise subspace of the extracted frequency component and extracting a frequency component where maximum power is located from a frequency spectrum based on the noise subspace;
    a time of arrival (TOA) extracting means for extracting TOA based on the frequency component where maximum power is located.

2. The apparatus as recited in claim 1, wherein the first spectrum analyzing means transforms an inputted signal into a frequency offset value corresponding to the multipath delay through Fast Fourier Transform (FFT).

3. The apparatus as recited in claim 2, wherein a size of a sample for the FFT is $2^n$ where n is an integer larger than 6.

4. The apparatus as recited in claim 1, wherein the second spectrum analyzing means acquires power spectrums for the reception signal based on the noise subspace of the inputted signal and analyzes the most dominant spectrum offset.

5. The apparatus as recited in claim 1, wherein the second spectrum analyzing means includes:
    an autocorrelation coefficient calculator for calculating an autocorrelation coefficient by performing circular convolution for the output signal of the first spectrum analyzing means;
    a principal eigenvector calculator for calculating a principal eigenvector from the autocorrelation coefficient according to a power method;
    a noise subspace calculator for calculating a noise subspace for the principal eigenvector;
    a spectrum generator for generating a frequency spectrum based on the principal eigenvector and the noise subspace; and
    a frequency component extractor for extracting a frequency component where the maximum power value is located from the frequency spectrum.

6. The apparatus as recited in claim 5, wherein the spectrum generator generates a frequency spectrum based on the most dominant noise subspace.

7. A high resolution distance ranging method using an ultra-wideband (UWB) communication, comprising the steps of:
    a) extracting a frequency component corresponding to multipath time delay from a reception signal;
    b) acquiring a noise subspace of the extracted frequency component and extracting a frequency component where maximum power is located from the frequency spectrum based on the noise subspace; and
    c) extracting a time of arrival (TOA) based on the frequency component where the maximum power is located.

8. The method as recited in claim 7, wherein in the step a), the inputted signal is transformed into a frequency offset value corresponding to the multipath delay through Fast Fourier Transform (FFT).

9. The method as recited in claim 8, wherein a size of a sample for the FFT is $2^n$ where n is an integer larger than 6.

10. The method as recited in claim 7, wherein in the step b), a power spectrum for a reception signal is acquired based on a noise subspace of the inputted signal and the most dominant spectrum offset is analyzed.

11. The method as recited in claim 7, wherein the step b) includes:
    b1) performing circular convolution on an output signal of the first spectrum analyzing means and calculating an autocorrelation coefficient;
    b2) calculating a principal eigenvector from the autocorrelation coefficient according to a power method;
    b3) calculating a noise subspace for the principal eigenvector;
    b4) generating a frequency spectrum based on the principal eigenvector and the noise subspace; and
    b5) extracting a frequency component where a maximum power value is located in the frequency spectrum.

12. The method as recited in claim 11, wherein in the step b4), the frequency spectrum is generated based on the most dominant noise subspace.

* * * * *